No. 868,734. PATENTED OCT. 22, 1907.
N. C. WALLENTHIN.
JOINT FOR BRACELETS.
APPLICATION FILED JUNE 21, 1907.

Witnesses
A. F. Borg
Robert E. Lanphear

Inventor
Nils C. Wallenthin.

By
Howard E. Barlow
Attorney

UNITED STATES PATENT OFFICE.

NILS C. WALLENTHIN, OF ATTLEBORO, MASSACHUSETTS.

JOINT FOR BRACELETS.

No. 868,734.   Specification of Letters Patent.   Patented Oct. 22, 1907.

Application filed June 21, 1907. Serial No. 380,047.

*To all whom it may concern:*

Be it known that I, NILS C. WALLENTHIN, a citizen of the United States, residing at Attleboro, in the county of Bristol and State of Massachusetts, have invented certain new and useful Improvements in Joints for Bracelets, of which the following is a specification, reference being had therein to the accompanying drawing.

This invention relates to joints for bracelets, and has for its object to provide a strong and durable joint of simple and practical construction.

A further object of the invention is to provide a joint which will be neat in its appearance when the bracelet is open and will be in such form as to entirely close the gap or opening between the arms of the bracelet when the same are drawn apart.

Heretofore in joints of this construction one of the members have been usually provided with a forked end which forked portions were liable to be opened or sprung apart when subjected to a heavy lateral strain. To obviate this difficulty I have provided a cross bar or tie at the end of the said portions whereby the same are firmly tied together to support each other thereby greatly increasing the strength of the joint.

Another feature of this device is that the two members are joined together by means of a stud riveted in position, said stud being provided with a T-shaped head whereby the members are inseparably bound together and at the same time allowed to slide freely one upon the other.

The invention is fully set forth in this specification and more particularly pointed out in the appended claims.

Figure 1:
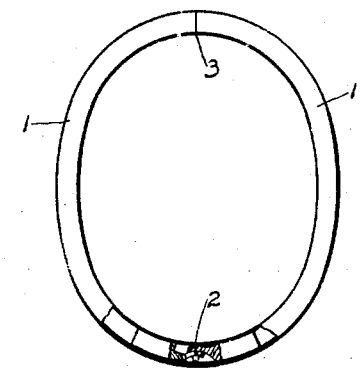
Figure 2:
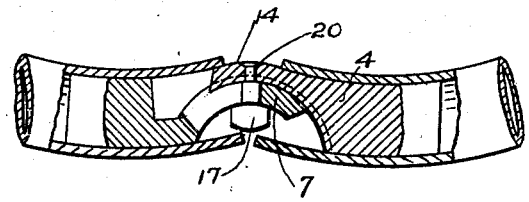
Figure 3:
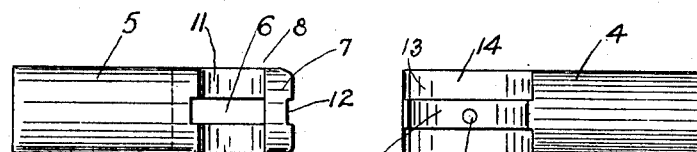
Figure 4:
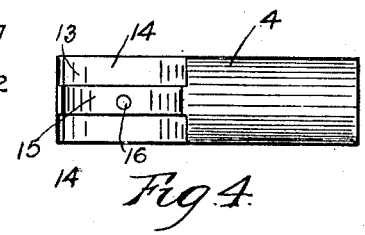
Figure 5:
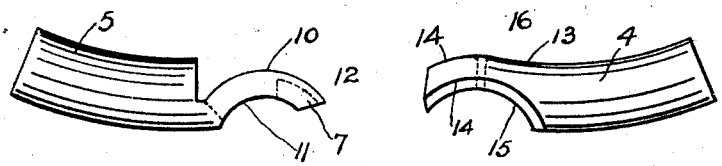
Figure 6:
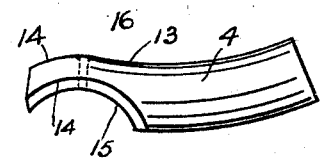
Figure 7:
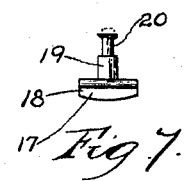

In the accompanying drawings: Figure 1— shows the bracelet in its closed position with a portion broken away disclosing the joint. Fig. 2— is an enlarged sectional side elevation of the joint members inserted in the adjacent ends of the tubular arms, said joint being in its open position. Fig. 3— is an enlarged plan view showing the under or outer side of the slotted joint member. Fig. 4— represents a corresponding side of the opposite or tongue member. Fig. 5— is a side elevation of the slot member. Fig. 6— is a corresponding elevation of the tongue member. Fig. 7— is the retaining stud having a T-shaped head.

Referring to the drawings at 1—1 are the two side arms of the bracelet preferably constructed of tubing and bent into the form to fit loosely around the wrist or arm of the wearer. In bracelets of the character illustrated it is customary to divide the same into two parts or arms and hinge said arms together so that they may be separated or opened to allow the wrist of the wearer to pass therethrough after which the arms may be closed together and locked in any convenient way. The point of separation at 2 is where the bracelet joint is formed while diametrically opposite at 3 is the opening point where the two parts are brought together and secured by any suitable locking device.

My improved bracelet joint is constructed of two interlocking members which may be formed integral with the adjacent ends of the bracelet arms, if desired, or they may be constructed separate and independent of said arms and subsequently secured in the tubing. At 4 is shown one of the interlocking members namely the tongue member, that is preferably constructed of solid wire bent to form the shape of the tubing and adapted to fit and be fixed into one end of one of the arms. The opposite member 5 may also be constructed of solid material, if desired, and is also bent to take the contour or form of the tubing and is adapted to be fixed into the adjacent end of the opposite arm. The member 5 is provided at one end with a slotted portion 6 formed lengthwise therein, the outer ends being connected by the bridge piece 7 which is preferably formed integral with said fingers 8 and 9 to stiffen and support the same. These fingers are formed on their upper face at 10 on the arc of a circle, the underside of the same at 11 being concaved also on a circle concentric with the upper face 10.

The bridge piece 7 is cut away at 12 so as to fit over the corresponding tongue on the opposite member. The tongue member 4 is provided with a forwardly extending overhanging bearing portion 13, which portion is formed integral with said member. The upper surface of the outer end of this portion is rounded off at 14 on the swinging radius of the joint so as to work into and just clear the tubing as the bracelet is opened and closed, as best illustrated in Fig. 2. The underside of this bearing portion at 14—14 is also formed on the arc of a circle to correspond with and slide on the circular faces 10—10 of the fingers 8 and 9 of the member 5. Extending downwardly from the central portion of this bearing member is a narrow guiding tongue 15 which is adapted to engage the recess 6 in the opposite member and slide between the fingers 8 and 9. A small hole 16 is drilled through the tongue and substantially in the center of the extending portion for the reception of the retaining stud. This retaining stud 17 is preferably constructed with a T-head 18 that extends across to engage both fingers, a body portion 19, and a short shank 20, which shank is adapted to fit in the hole 16 in the tongue member. After the parts have all been thus formed the two joint portions of the members are placed in position one upon the other and the shank 20 of the retaining stud is forced into the hole 16 in the tongue member and riveted therein, firmly retaining the two members together at the same time affording an easy sliding movement of one upon the other. The members may then be secured in the adjacent ends of the tubular arms and the bracelet is complete.

By constructing a bracelet in my improved manner the same is exceedingly strong and durable, the fingers being firmly tied together at their ends and adapted to engage the guiding tongue in the opposite member which slides between them. The two members are then subsequently fastened together by the retaining stud 17 which also serves as a stop to limit the opening motion of the bracelet by the bringing up of the bridge against the body of the stud, in the manner illustrated in Fig. 2.

My improved joint is very simple and inexpensive in construction, is exceedingly strong and durable and effective in its operation.

Having thus described my invention, what I claim as new and desire to secure by Letters Patent, is:—

1. In a bracelet, a joint formed of two members hinged together, one of said members being provided with a reduced portion having an elongated slot forming a pair of outwardly extending fingers, a bridge across the outer ends of said fingers to tie the same together, the extending portion of the opposite hinged member being adapted to slide on said fingers, and a retaining stud for holding the members together.

2. In a bracelet, a joint formed of two members hinged together, one of said members being provided with a reduced portion having an elongated slot forming a pair of outwardly extending fingers, a bridge across the outer ends of said fingers to tie the same together, said fingers being formed on both their upper and under faces longitudinally on the arc of a circle, the extending portion of the opposite tongue member being curved to fit and slide on said fingers, and a retaining stud for holding the members together.

3. In a bracelet, a joint formed of two members hinged together, one of said members being provided with a reduced portion having an elongated slot forming a pair of outwardly extending fingers, a bridge across the outer ends of said fingers to tie the same together, said fingers being formed on both their upper and under faces longitudinally on the arc of a circle, the extending portion of the tongue member being curved to fit and slide on said fingers, and a retaining stud fixed in the tongue member and adapted to pass through said slot, said stud being provided with a head adapted to engage and slide on the outer curved portion of said fingers.

4. In a bracelet, a joint formed of two members hinged together, one of said members being provided with a reduced portion having an elongated slot forming a pair of outwardly extending fingers, a bridge across the outer ends of said fingers to tie the same together, said fingers being formed on both their upper and under faces longitudinally on the arc of a circle, the extending portion of the tongue member being curved to fit and slide on said fingers, and a stud adapted to pass through said slot and be riveted in said tongue member, said stud being provided with a head adapted to cross said slot and engage the outer curved surface of both fingers, said stud being also adapted to engage the bridge and form a stop to limit the opening motion of the bracelet.

In testimony whereof I affix my signature in presence of two witnesses.

NILS C. WALLENTHIN.

Witnesses:
 HOWARD E. BARLOW,
 E. I. OGDEN.